(12) United States Patent
Atkinson

(10) Patent No.: US 12,250,928 B2
(45) Date of Patent: Mar. 18, 2025

(54) ANTI-PREDATOR DEVICE FOR BEEHIVE

(71) Applicant: Bee-IQ Solutions Limited, Warkworth (NZ)

(72) Inventor: Kyle Blair Wayne Atkinson, Warkworth (NZ)

(73) Assignee: Bee-IQ Solutions Limited, Warkworth (NZ)

( * ) Notice: Subject to any disclaimer, the term of this patent is extended or adjusted under 35 U.S.C. 154(b) by 249 days.

(21) Appl. No.: 17/416,777

(22) PCT Filed: Dec. 20, 2019

(86) PCT No.: PCT/EP2019/086673
§ 371 (c)(1),
(2) Date: Jun. 21, 2021

(87) PCT Pub. No.: WO2020/127966
PCT Pub. Date: Jun. 25, 2020

(65) Prior Publication Data
US 2022/0071178 A1  Mar. 10, 2022

(30) Foreign Application Priority Data
Dec. 21, 2018 (NZ) ........................................ 749552

(51) Int. Cl.
*A01K 47/06* (2006.01)
*A01K 51/00* (2006.01)

(52) U.S. Cl.
CPC .............. *A01K 47/06* (2013.01); *A01K 51/00* (2013.01)

(58) Field of Classification Search
CPC ...... A01K 39/0113; A01K 47/06; A01L 51/00
See application file for complete search history.

(56) References Cited

U.S. PATENT DOCUMENTS

| | | | |
|---|---|---|---|
| 11,547,096 B2* | 1/2023 | Holmes | A01K 47/06 |
| 2012/0077412 A1* | 3/2012 | Put | A01K 51/00 |
| | | | 449/20 |
| 2021/0400924 A1* | 12/2021 | Hanscom | A01K 47/06 |

FOREIGN PATENT DOCUMENTS

| | | |
|---|---|---|
| EP | 2478764 A1 | 7/2012 |
| GB | 619449 A | 3/1949 |

(Continued)

OTHER PUBLICATIONS

WIPO, PCT Form ISA210 International Search Report for PCT/EP2019/086673, pp. 6 (mailed Mar. 24, 2020).

(Continued)

*Primary Examiner* — Peter M Poon
*Assistant Examiner* — Shada Mohamed Alghailani
(74) *Attorney, Agent, or Firm* — UltimatEdge IP Law Group, P.C.; Dean G. Stathakis

(57) ABSTRACT

The present specification discloses a beehive comprising (i) an exterior wall, (ii) a hive interior, and (iii) an entrance through the wall that allows access and egress of bees to and from the hive interior. A beehive disclosed herein can further comprise (iv) a beehive entrance tunnel having a proximal entrance end at the hive entrance and a distal exit end that extends into the hive interior. In operation, the bees enter the beehive by proceeding along the tunnel; wherein in use of the hive the tunnel is sufficiently elongated that when host bees are present invading pests, e.g. bees or wasps, entering the beehive via the tunnel encounter host bees in the tunnel resulting in attacks in the tunnel by host bees on the invading bees or wasps. Existing hives are modified so as to have such an entrance tunnel.

19 Claims, 10 Drawing Sheets

(56) References Cited

FOREIGN PATENT DOCUMENTS

| JP | 2003023908 | A | | 1/2003 |
|----|------------|---|---|--------|
| KR | 200270493 | Y1 | * | 3/2002 |
| KR | 200478892 | Y1 | * | 3/2011 |
| KR | 20110024884 | A | * | 3/2011 |
| KR | 20140005131 | U | * | 9/2014 |
| KR | 101829584 | B1 | * | 2/2018 |
| KR | 101922670 | B1 | | 11/2018 |
| KR | 102019200 | B1 | * | 9/2019 |
| WO | WO-2016156632 | A1 | * | 10/2016 |

OTHER PUBLICATIONS

WIPO, PCT Form ISA237 Written Opinion for PCT/EP2019/086673, pp. 8 (mailed Mar. 24, 2020).

WIPO, PCT Form IB373 International Preliminary Report on Patentability for PCT/EP2019/086673, pp. 8 (mailed Jul. 1, 2021).

BeeKeepinglove.com, How To Stop Robbing Bees? Things You Need To Know, https://beekeepinglove.com/how-to-stop-robbing-bees, pp. 4 (2024).

Downs, et al., Adaptive Shifts in Honey Bee (*Apis mellifera* L.) Guarding behavior Support Predictions of the Acceptance Threshold Model, Behav. Ecol. 11(3): 326-333 (2000).

Ellis, Small Hive Beetle, Featured Creature, pp. 8 (2023).

Free, The Behaviour of Robber Honeybees, Behav. 7: 233-239 (1955).

Hood, et al., The Small Hive Beetle, *Aethina tumida*: A Review, Bee World 85(3): 51-59 (2004).

Neumann, et al., Hit-and-Run Trophallaxis of Small Hive Beetles, Ecol. Evol. 5(23): 5478-5486 (2015).

Sheridan, et al., Small Hive Beetle Management in Mississippi, pp. 20 (2012).

Tew, The Rational World of Robber Bees, https://www.beeculture.com/the-rational-world-of-robber-bees (2021).

* cited by examiner

ANTI-PREDATOR DEVICE FOR BEEHIVE

This application is a 35 U.S.C. § 371 U.S. national stage patent application which claims the benefit of priority and is entitled to the filing date of International Patent Application PCT/EP2019/086673, filed Dec. 20, 2019, an application that claims the benefit of priority and is entitled to the filing date of NZ 749552, filed Dec. 21, 2018, the content of each of which is hereby incorporated by reference in its entirety.

FIELD OF THE INVENTION

The present invention relates to an anti-predator device for a beehive. More particularly but not exclusively the present invention relates to a hive entrance tunnel which defines a point of entry to a beehive designed to improve hive defence against pests, e.g. predator wasps and bees.

BACKGROUND TO THE INVENTION

A modern beehive for cultivating bees is generally in the form of a box with components that can be removed for inspecting the hive or accessing the honey. The box provides most of the structure of the hive and the bees form and/or build on the internal hive components to maintain and expand the bee colony. The most popular forms of modern hives will include a bottom board as the base on which the hive body rests. An opening between the bottom board and one of the partially cut-away walls of the hive body provides the entrance to the hive for the bees to enter and exit.

A typical bottom board consists of either a flat board as a base with upstanding walls on three sides of the base or a base with a sunken portion for bees to enter a hive. A gap is provided for bees to enter and exit the hive.

The size and shape of the gap is usually restricted in an effort to prevent entry to the hive of unwanted intruders, such as larger insects, mice and other rodents. It is known to close the hive entry point to a dimension of about 25 mm×25 mm in an effort to prevent entry of pests. Other forms and dimensions of entry gaps are known as attempts to reduce pest entry to the hive.

There is an additional problem of wasps entering a beehive to consume resources within the hive such as the bees themselves, larvae, honey and pollen stores, or supplementary feed sources. Restricting the size of a hive entrance gap may slow or prevent entry of an intruding wasp, as it allows the bees to better defend the hive while they are actively positioned at the entrance of the hive. However, during summer or other times of high bee numbers and productivity, a reduced entrance size is not practical as it is desirable to have a relatively large hive entrance to allow for the larger number of bees to enter and exit the hive.

Despite these preventative measures the problem of either total or partial beehive loss due to wasp activity creates a significant economic cost to the bee industry in general. Various lures have been developed to capture wasps outside of hives, however their effectiveness is extremely inconsistent. Chemical control measures have also been developed, such as VESPEX®. These appear to be more effective than lures, however the use of toxic poisons create their own set of challenges and user preferences.

A related problem is hive robbing not only by wasps but also by bees from neighbouring, competing hives, especially at times of dwindling resources such as towards the end of the honey season.

Accordingly, it is an object of the invention to provide a device to improve upon one or more of the shortcomings of the prior art, and/or to at least provide the public with a useful choice. Another object is to provide a method of reducing or even preventing hive attack, invasion and/or robbery by predators such as wasps and other bees. Preferred embodiments provide improved methods of modifying beehives and improved beehives.

SUMMARY OF THE INVENTION

As used herein the terms bee and bees generally refer to domesticated and/or cultivated honeybees. As used herein the terms pest and pests generally refer to wasps, robber bees, hornets or other such predators/pests that raid beehives for resources through the front entrance and generally use avoidance techniques.

Accordingly, in a first aspect, the invention provides a beehive entrance tunnel for a beehive having an outer wall with a beehive entrance aperture, wherein the tunnel comprises:
  an elongate structure having an entrance aperture at a first end and an exit aperture located at or proximate an opposing end; and
  wherein the tunnel further comprises opposing sidewalls, each opposing sidewall comprising an outwardly orientated contour located proximate the entrance aperture, the contour operable to form a seal with the beehive outer wall and facilitate pivoting of the exit aperture within the beehive while maintaining that seal.

In another aspect, the invention provides a beehive entrance tunnel comprising: an elongate tubular tunnel adapted for fitment to the base of a beehive, the tunnel comprising an interior defined by at least an upper tunnel surface portion,
  wherein the tunnel comprises a first opening located at one end to thereby define a hive entrance;
  and
  wherein the tunnel further comprises a second opening located in the upper tunnel surface portion to thereby define a tunnel exit.

In another aspect, the invention provides a beehive entrance tunnel comprising:
  a floor surface and a ceiling surface spaced apart by a sidewall;
  a first aperture in the sidewall defined between the floor surface and ceiling surface at a first tunnel end;
  a second aperture located in the ceiling surface and orientated perpendicular to the tunnel entrance.

In some aspects, the contour is circular and comprises a convex plan form.

In some aspects, the circular contour comprises a frusto-circular plan form.

In some aspects, the circular contour comprises a flare plan form.

In some aspects, the tunnel comprises a ceiling surface, and the exit aperture is located in the ceiling surface.

The invention also provides a method of modifying a beehive, comprising:
  providing a beehive having a hive entrance; and
  modifying the beehive by adding or forming a beehive entrance tunnel having a proximal entrance end at the hive entrance and a distal exit end that extends into an interior of the hive,
  wherein invading pests entering the hive encounter host bees in the tunnel.

In context, reference to the tunnel entrance refers to the entrance for bees or pests entering the hive from outside and the tunnel exit is the exit from the tunnel into the hive interior. Bees or pests exiting the hive via the tunnel go in the opposite direction.

The invention thus provides a tunnel which is a space in which the freedom of movement of the pest is limited while the pest is trying to get into the hive. As a result there is increased chance of interaction between an invading pest and host bees, e.g. guard bees, compared with an unmodified beehive. The nature of the environment provided in the tunnel is more likely to feel threatening or otherwise elicit a stress-related reaction from the pest. Pheromones may as a result be released in increased amounts by the pest, which pheromones can alert host bees to the pest's presence. Either or both of these can raise the chance of encounters between pests and host bees and increase attacks on pests as they attempt to enter the hive; overall pest invasion into the hive is reduced and for those that do manage to enter the hive, pest escape is reduced.

In preferred embodiments, the tunnel comprises at least 2 sections, a first section in which bees must move substantially horizontally to advance towards the hive interior and a second section in which bees must move substantially vertically to exit the tunnel and gain access to the interior. In use, bees or pests entering the hive must do so in a non-linear way. The geometry of the tunnel promotes movement of the bees or pests first inwards and then upwards, preferably towards/into the cluster and promoting encounters between pests and hosts. The intruder may thus be naturally forced into engagement with the host and a release of stress pheromone may be initiated promoting further attack on the intruder creating an ongoing cycle of pheromone release and attack. Another consequence is that to exit the hive, bees or pests must do the reverse, and move downwards into the tunnel and then outwards. Generally, pests find exiting easier when they can see a visual clue of the outside world. For a pest not yet in the tunnel, however, it is preferred that there is no line-of-sight from any position inside the hive (NB, as mentioned, not yet in the tunnel) to the outside. A pest inside the hive cannot see the visual clue of the outside and so may be confused as to the location or direction of the exit. This prolongs pest time in the hive and increases the chance of encounter with and attack by host bees.

In more detail, in use of tunnels of the invention, bees enter the beehive by proceeding along the tunnel, wherein the tunnel is sufficiently elongated that when host bees are present invading pests, such as for example invading bees or wasps, entering the beehive via the tunnel encounter host bees in the tunnel resulting in attacks by host bees on the pests.

In particular embodiments, there is provided a method of modifying a beehive, comprising:
providing a beehive having an exterior wall, a hive interior and a hive entrance through the wall that allows access and egress of bees to and from the hive interior; and
modifying the beehive by adding or forming a beehive entrance tunnel having a proximal entrance end at the hive entrance and a distal exit end that extends into the hive interior,
wherein during use of the beehive bees enter the beehive by proceeding along the tunnel;
wherein the tunnel is sufficiently elongated that when host bees are present invading bees or wasps or other pests entering the beehive via the tunnel encounter host bees in the tunnel resulting in attacks in the tunnel by host bees on the invading pests.

Still further embodiments of the invention provide a method of modifying a beehive, comprising:
providing a beehive having an exterior wall, a hive interior and an entrance through the wall that allows access and egress of bees to and from the hive interior; and
modifying the beehive by adding or forming a beehive entrance tunnel having a proximal entrance end sealed to the hive entrance and a distal exit end that extends into the hive interior,
wherein bees enter the beehive by proceeding along the tunnel; and
wherein when bees are present the tunnel exit is at or adjacent the bee cluster.

In use of these embodiments, when host bees are present invading pests (e.g. bees or wasps) entering the beehive arrive at the bee cluster and encounter host bees at or in the vicinity of the cluster, resulting in attacks by host bees on the invading bees or wasps.

Another embodiment of the invention provides a method of modifying a beehive, comprising:
providing a beehive having an exterior wall, a hive interior and an entrance through the wall that allows access and egress of bees to and from the hive interior; and
forming a beehive entrance tunnel sealed to the entrance that is at least 50 mm wide, up to 12 mm high and extends at least 100 mm into the hive interior.

Also provided by the invention is a beehive, comprising:
(i) an exterior wall,
(ii) a hive interior, and
(iii) an entrance through the wall that allows access and egress of bees to and from the hive interior;
wherein the hive further comprises
(iv) a beehive entrance tunnel having a proximal entrance end at the hive entrance and a distal exit end that extends into the hive interior,
wherein bees enter the beehive by proceeding along the tunnel;
wherein in use of the hive the tunnel is sufficiently elongated that when host bees are present invading bees or wasps entering the beehive via the tunnel encounter host bees in the tunnel resulting in attacks in the tunnel by host bees on the invading bees or wasps.

Still further provided by the invention is a beehive, comprising:
(i) an exterior wall,
(ii) a hive interior, and
(iii) an entrance through the wall that allows access and egress of bees to and from the hive interior;
wherein the hive further comprises
(iv) a beehive entrance tunnel sealed to the entrance that is at least 50 mm wide, up to 12 mm high and extends at least 100 mm into the hive interior.

Preferably, the tunnel is sufficiently elongated that when host bees are present invading pests entering the beehive via the tunnel encounter host bees in the tunnel resulting in attacks in the tunnel by host bees on the invading pests and also when bees are present the tunnel exit is at or adjacent the bee cluster.

Preferably, the tunnel entrance, also referred to as its proximal entrance end, is sealed to the hive entrance, as described elsewhere herein.

It is further optional to modify a hive, or provide a hive per se, with a plurality of tunnels of the invention, increasing the volume of bee traffic according to the needs of the season.

Preferably, in use, the tunnel is sufficiently elongated that when host bees are present invading bees or wasps or other pests entering the beehive encounter host bees to an increased extent compared with hives not having the tunnel, resulting in increased attacks by host bees on the invading pests and reduced incidence of beehive robbing by the invading pests, again compared with hives not having the tunnel.

The following may relate to any of the above aspects. Other aspects of the invention may become apparent from the following description which is given by way of example only and with reference to the accompanying drawings.

As used herein the term "and/or" means "and" or "or" or both.

As used herein "(s)" following a noun means the plural and/or singular forms of the noun.

The term "comprising" as used in this specification means "consisting at least in part of". When interpreting statements in this specification which include that term, the features, prefaced by that term in each statement or claim, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE FIGURES

The invention will now be described with reference to the accompanying figures in which.

DETAILED DESCRIPTION OF THE PREFERRED EMBODIMENTS

In reference to the figures, preferred embodiments of the invention will be illustrated by way of non-limiting examples. Although it is anticipated that the general invention as described has other uses, the preferred use of the invention is as a device facilitating the optimal positioning of an entrance to a beehive, as well as to support the bees' natural defence mechanisms.

The natural hive defence mechanism in bees is dependent upon both the environmental conditions and their defence process: when the outside temperature is below a certain level, the bees cluster in a hive in order to maintain ideal temperature and to conserve energy; when the temperature warms up sufficiently, bees begin to leave the hive to forage for food and to start defending the hive entrance.

Wasps can be active at lower temperatures, when bees are inactive. There is a temperature range which provides a window of opportunity for wasps to enter a hive where bees are not actively using the beehive entrance or defending it. The process of bees defending their hive against wasps is through biting and stinging. This process requires multiple bees to attack a single wasp and it has been documented that on average five to ten bees are required to sting a wasp in order to kill it. This bee defence process can be detrimental to the performance of the beehive. Further if a wasp successfully enters then exits a beehive, it will communicate to the nest members where the hive is, so that more wasps are able to join the raid.

Figure 5:
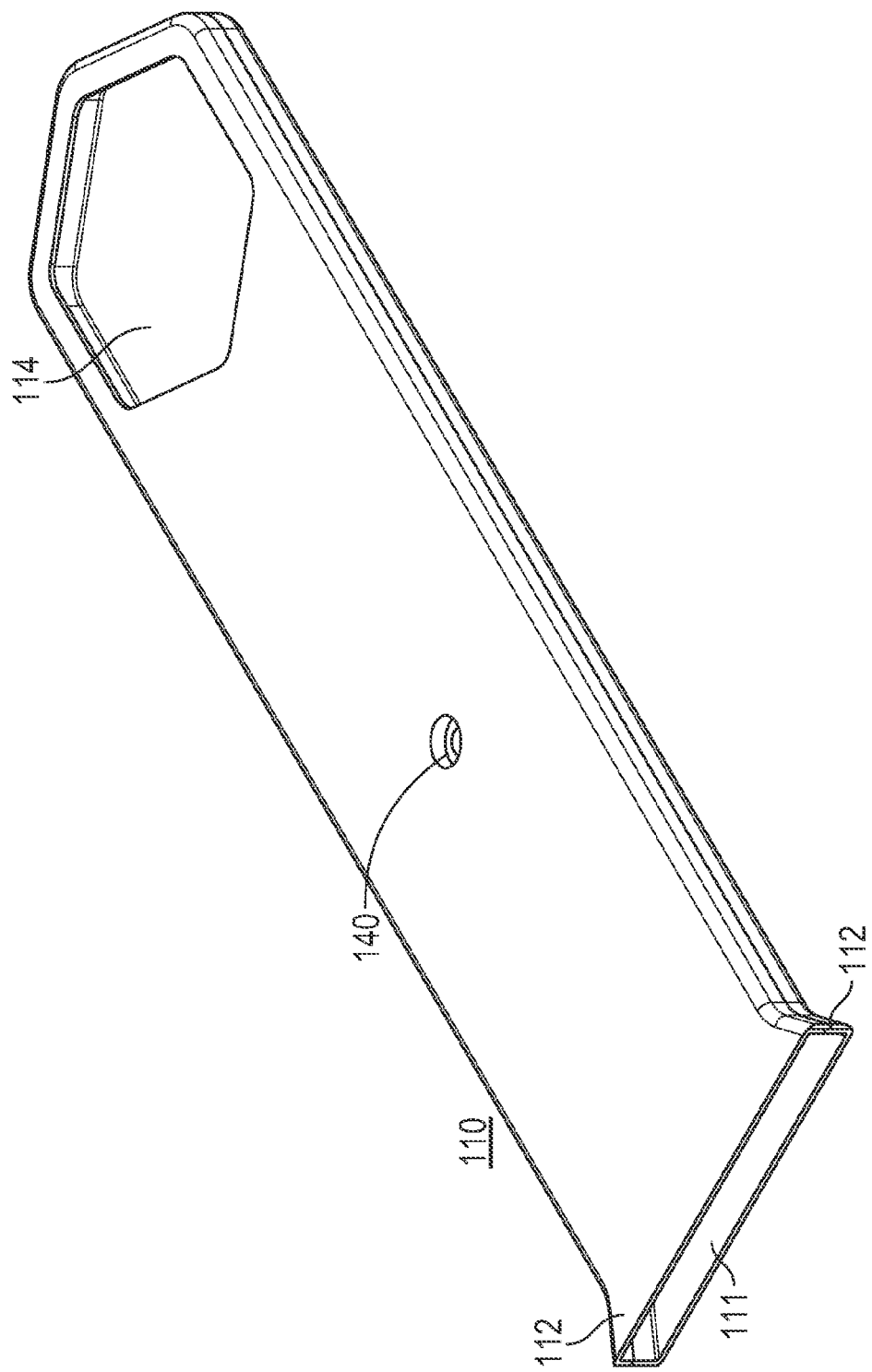
FIG. 5 shows a view from above and to the side of a second embodiment of the invention.

Embodiments of the invention relate to a device intended to improve the difficulty for a pest to both enter and exit a hive compared to the devices of the prior art. FIG. 5 shows a perspective view of one embodiment of a beehive entrance tunnel (110). The tunnel is a generally elongate form, having a hollow interior with a low height qualified by providing for no more vertical space than is required by one bee.

The location of the queen bee and the larvae inside the beehive typically attracts a large quantity of bees in that same area, referred to as the cluster. The tunnel provides a path which extends between the exterior of the beehive to a location near the active cluster within the hive. The tunnel has an entrance (111) defined by an aperture between the interior and exterior of the tunnel. At the opposing end of the tunnel is a tunnel exit (114) defined by an aperture which extends from the interior of the tunnel to the exterior and allows bees to leave the tunnel and enter the hive.

In some embodiments, the tunnel is constructed from two parts as shown by FIG. 6. A first part (132) defines a lower portion of the tunnel including the tunnel floor, and a second part (131) defines an upper portion of the tunnel including the tunnel ceiling. In the embodiment shown, each of the upper and lower parts has a portion of the sidewall configured for abutment as the upper and lower parts are brought together to form the tunnel. The upper and lower tunnel sections may be secured together using any conventional fastener device such as a screw, bolt, adhesive, mechanical engagement or interference or the like. In FIG. 6, an exemplary securing arrangement is shown where a boss (133) in the upper part (131) and complementary aperture (134) in the lower part (132) allow for a fastener to engage and secure the parts together.

In some embodiments, the tunnel is formed by an upper tunnel section operably engaged with a pre-existing floor of a beehive. Other forms of tunnel may be formed by interaction with tunnel wall components and pre-existing walls which may be present in a beehive.

The ability to position the tunnel exit proximate the hive cluster is a preferred feature of the invention. To facilitate movement of the tunnel exit relative to a gap in a beehive outer wall, various exemplary embodiments are presented. In each exemplary embodiment, the tunnel comprises a sealing surface shaped for engagement with the outer wall of the hive, and shaped to allow movement of the tunnel to desirably position the tunnel exit while retaining the seal with the entrance/outer wall of the hive. The term seal or sealed as used in this specification means that the space between the outer surface of the tunnel and the inner surface of the beehive outer wall are sufficiently close enough to prevent bees or wasps from traversing the tunnel and entering the hive another way. A seal may be formed by a gap spacing of between 0 and 1, 0 and 2, 0 and 3 or 0 and 4 mm. As a result, invading bees or wasps cannot bypass the tunnel on their way into the hive.

Figure 1A:
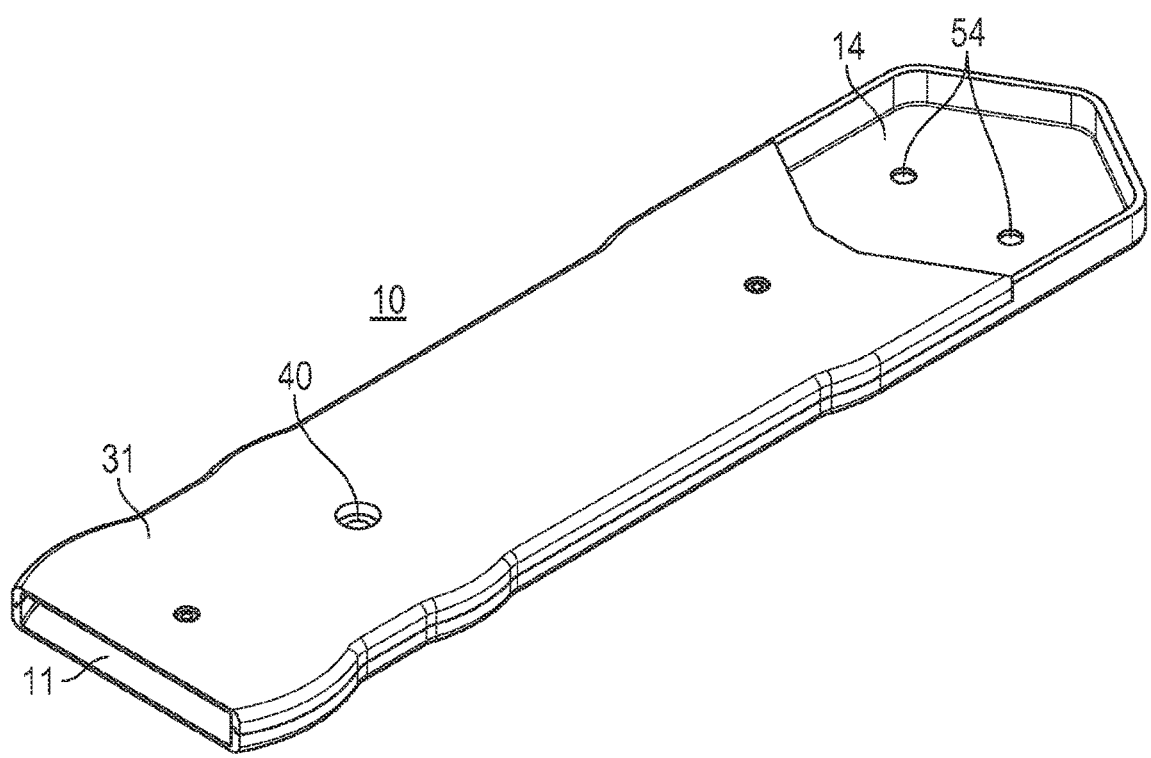
FIGS. 1*a* and 1*b* show views from above and to the side of the upper and undersides respectively of a first embodiment of the invention.
Figure 1B:
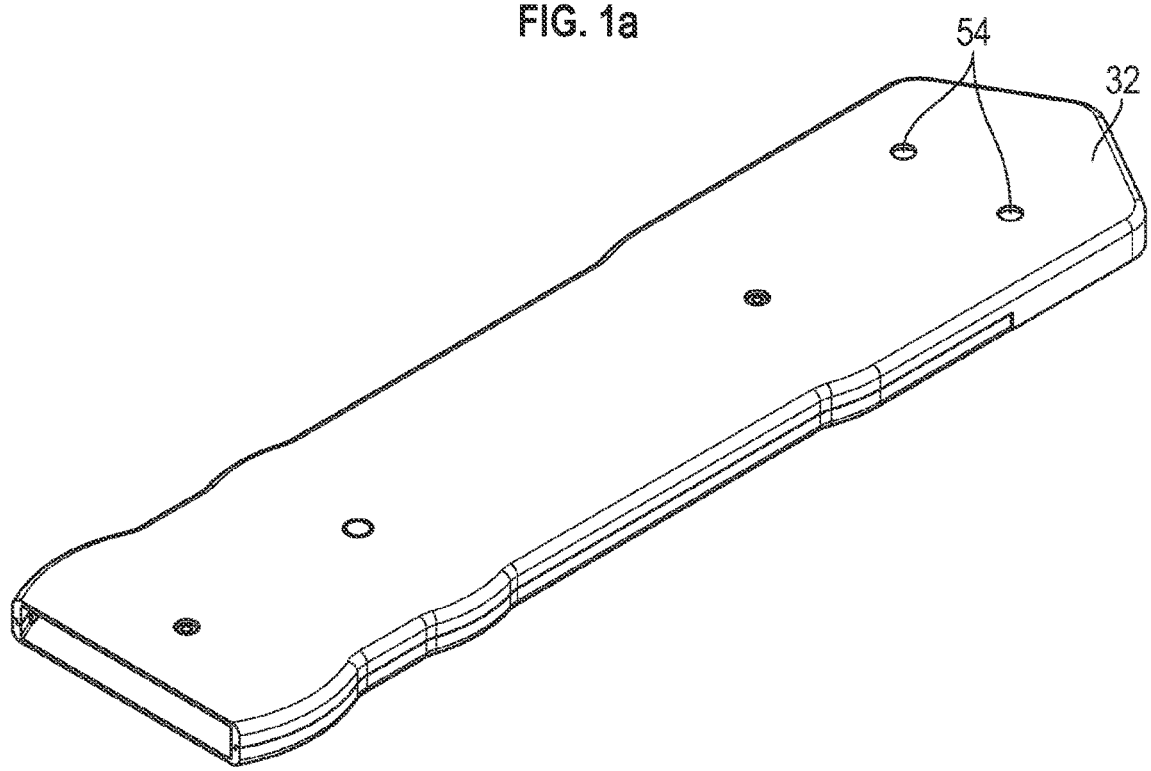
Figure 2A:
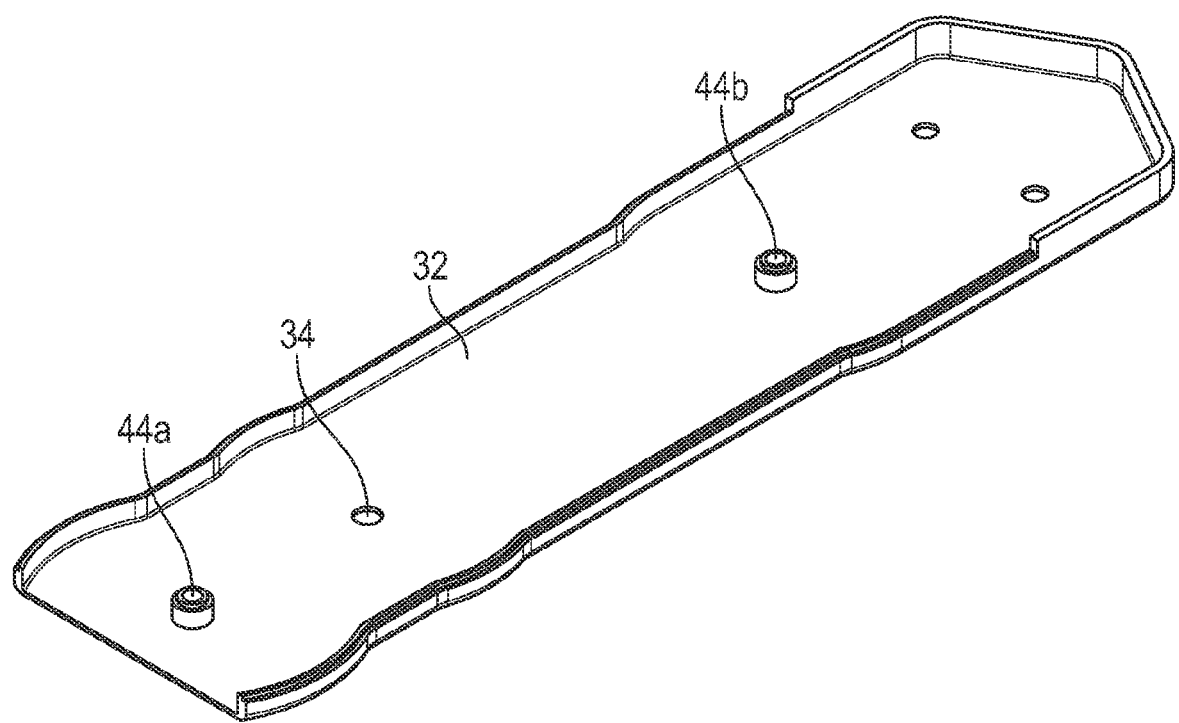
FIGS. 2*a* and 2*b* show views from above and to the side of the upper and undersides respectively of the lower tunnel portion of the first embodiment of the invention.
Figure 2B:
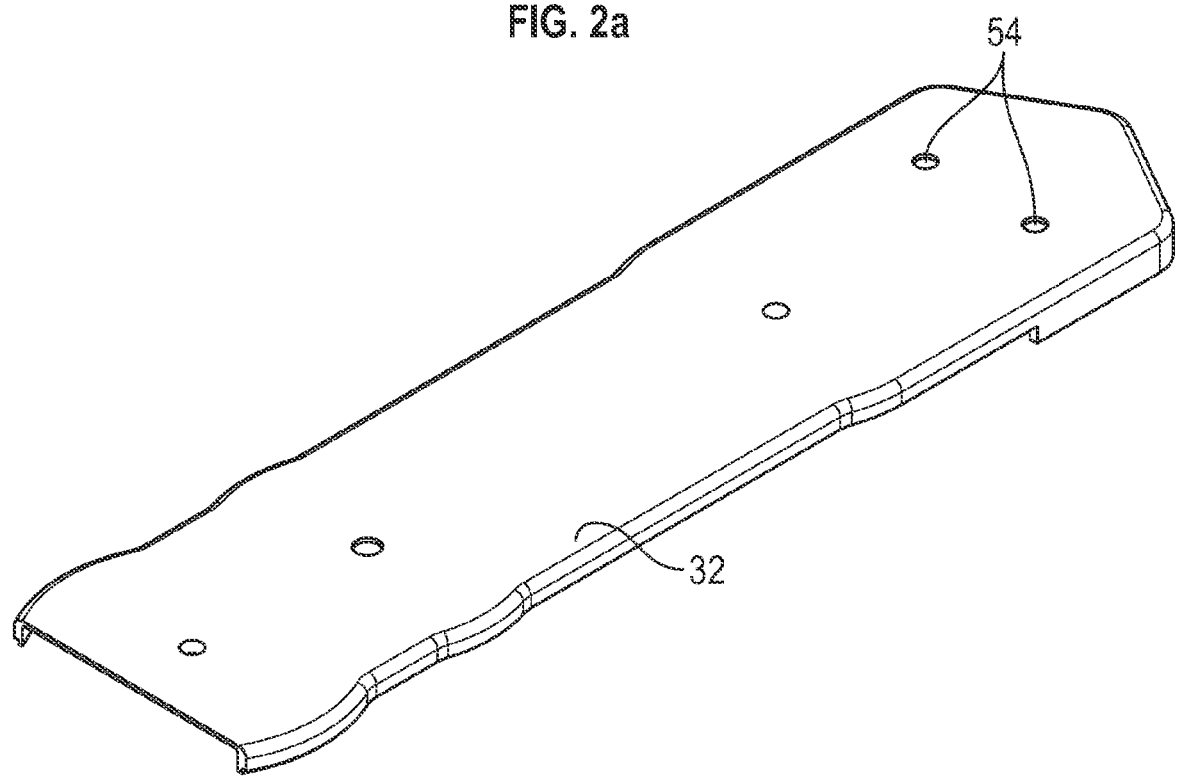
Figure 3A:
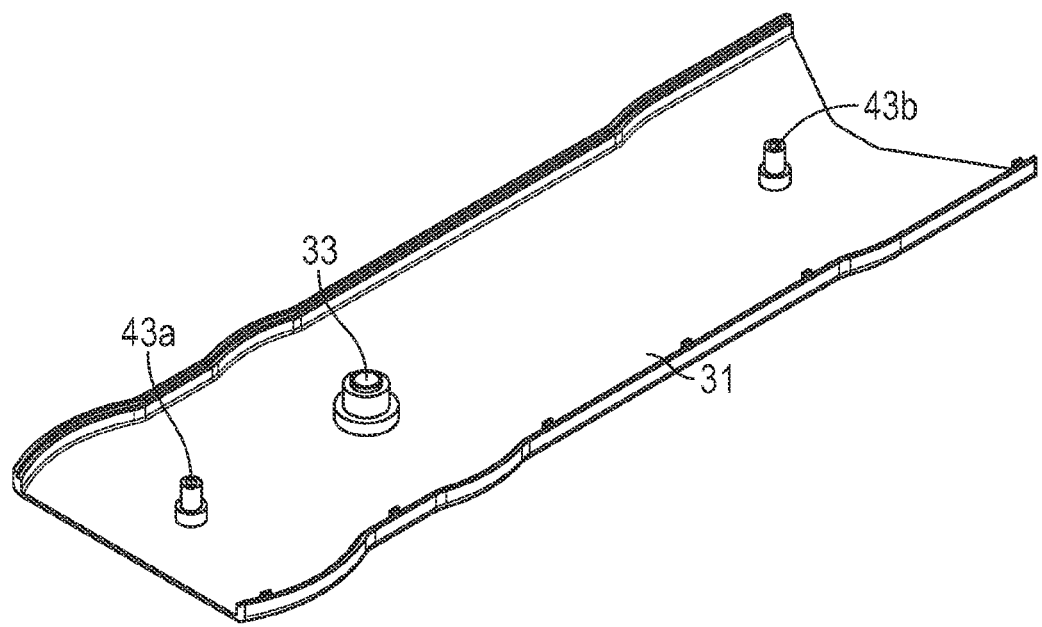
FIGS. 3*a* and 3*b* show views from above and to the side of the under and uppersides respectively of the upper tunnel portion of the first embodiment of the invention.
Figure 3B:
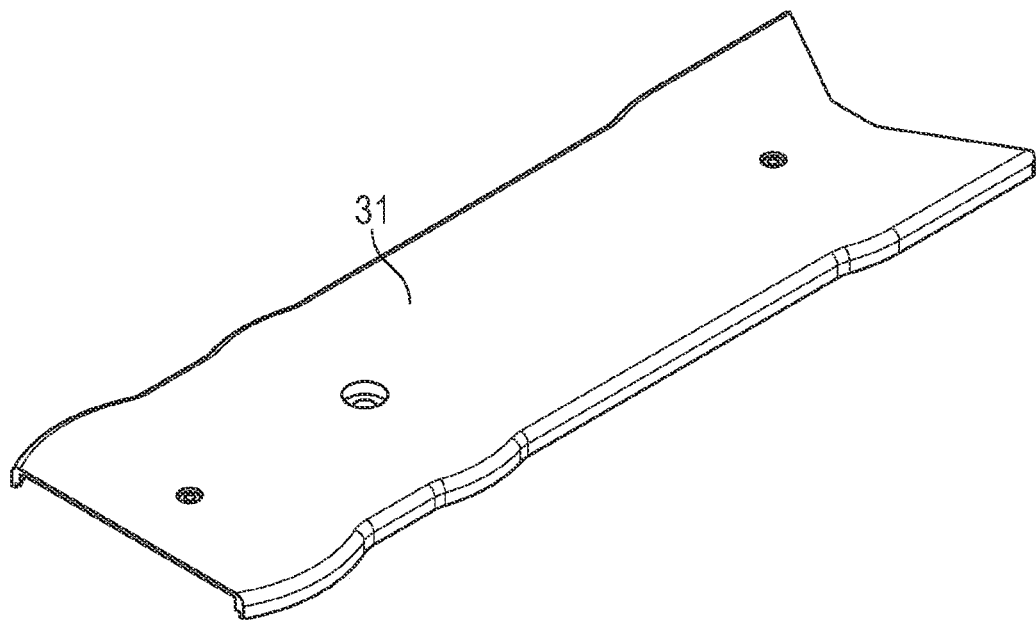
Figure 4:
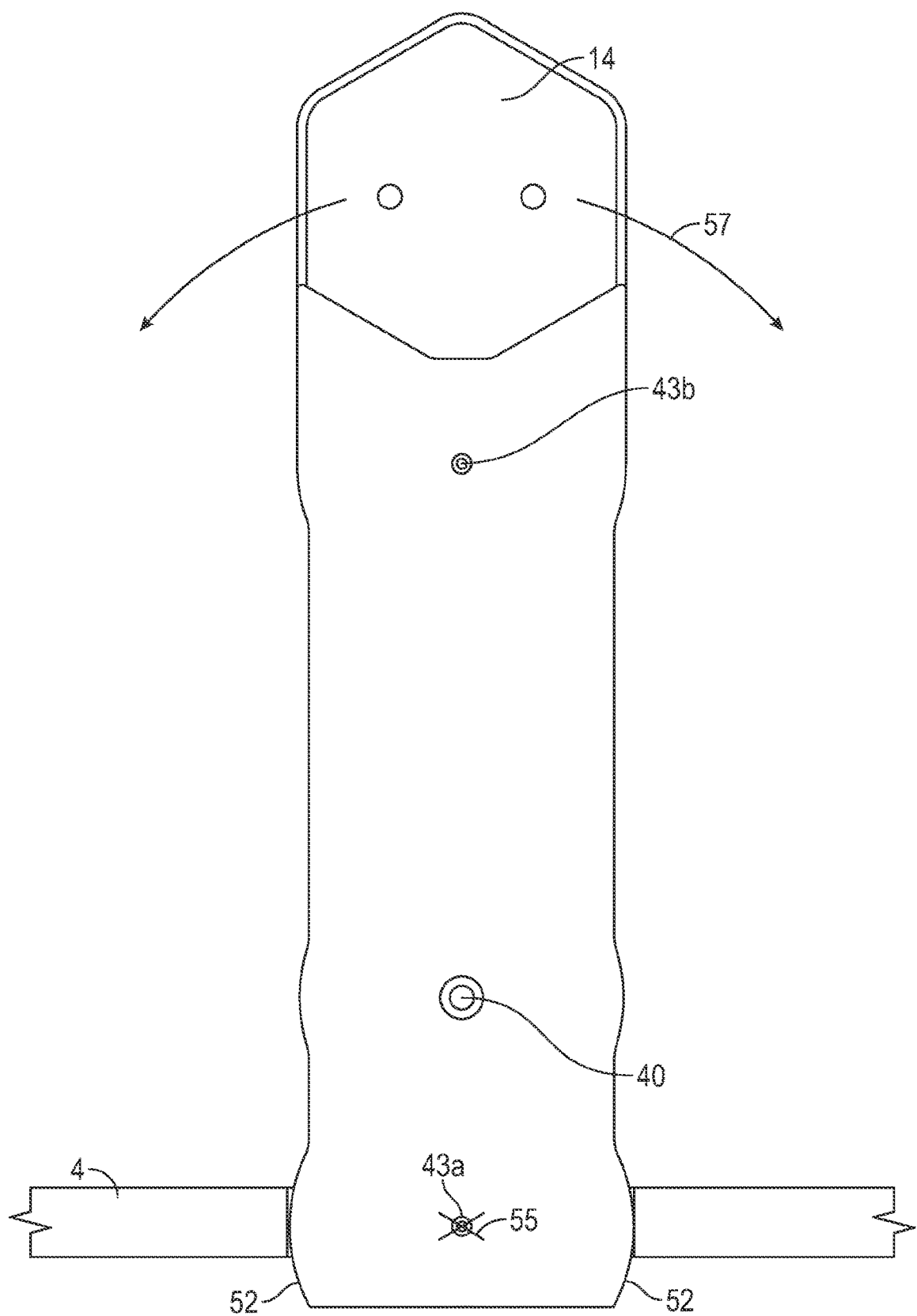
FIG. 4 shows a view from above of the first embodiment of the invention installed in a hive entrance.

In preferred embodiments, the tunnel entrance includes a circular contour in at least the outer walls (e.g. 52 in FIG. 4). The circular contour allows the position of the tunnel exit aperture to be pivoted while retaining a seal with the hive wall.

Figure 7:
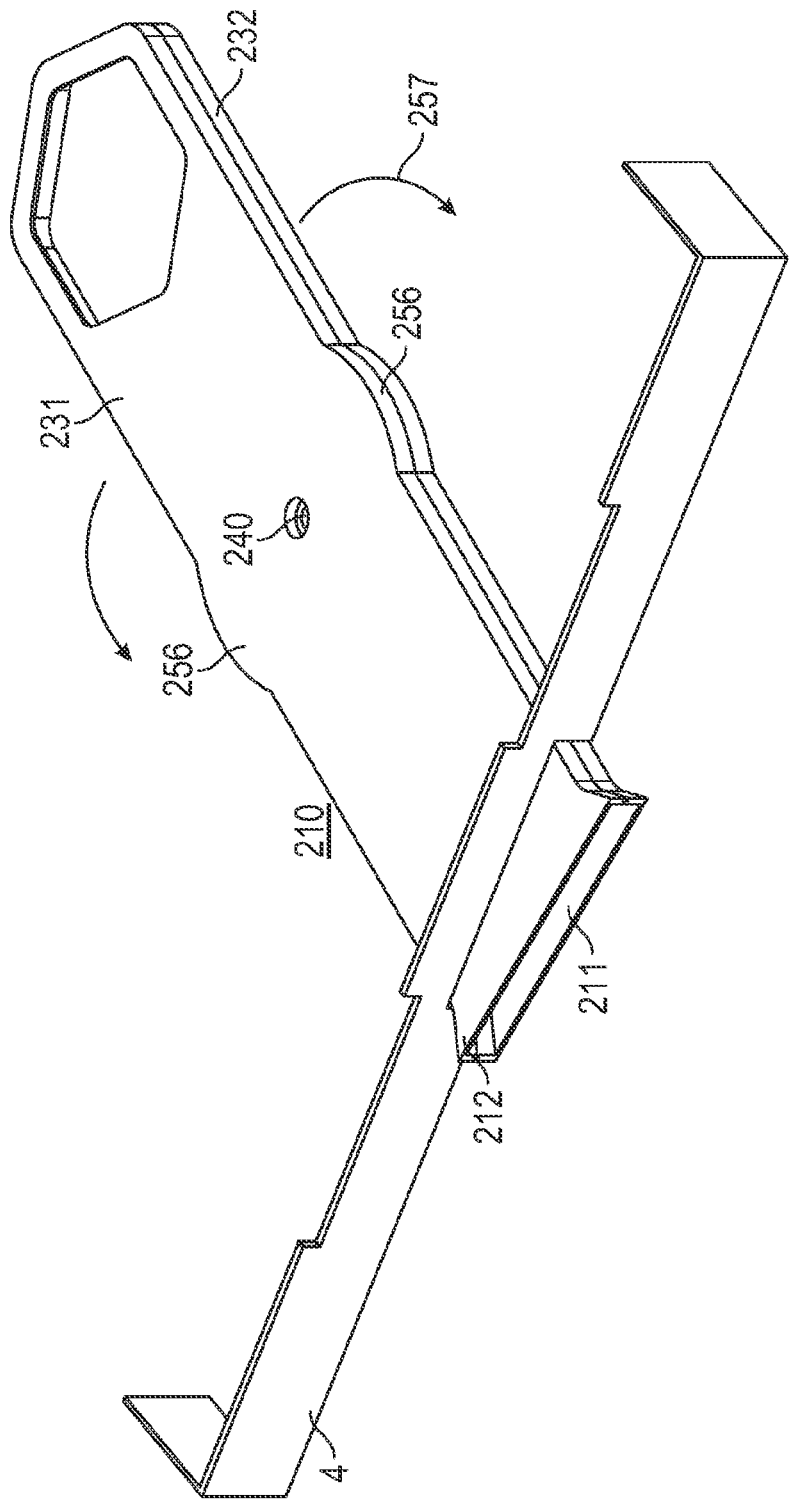
FIG. 7 shows a view from above and to the side of a third embodiment of the invention fitted into a hive entrance of a beehive.
Figure 8:
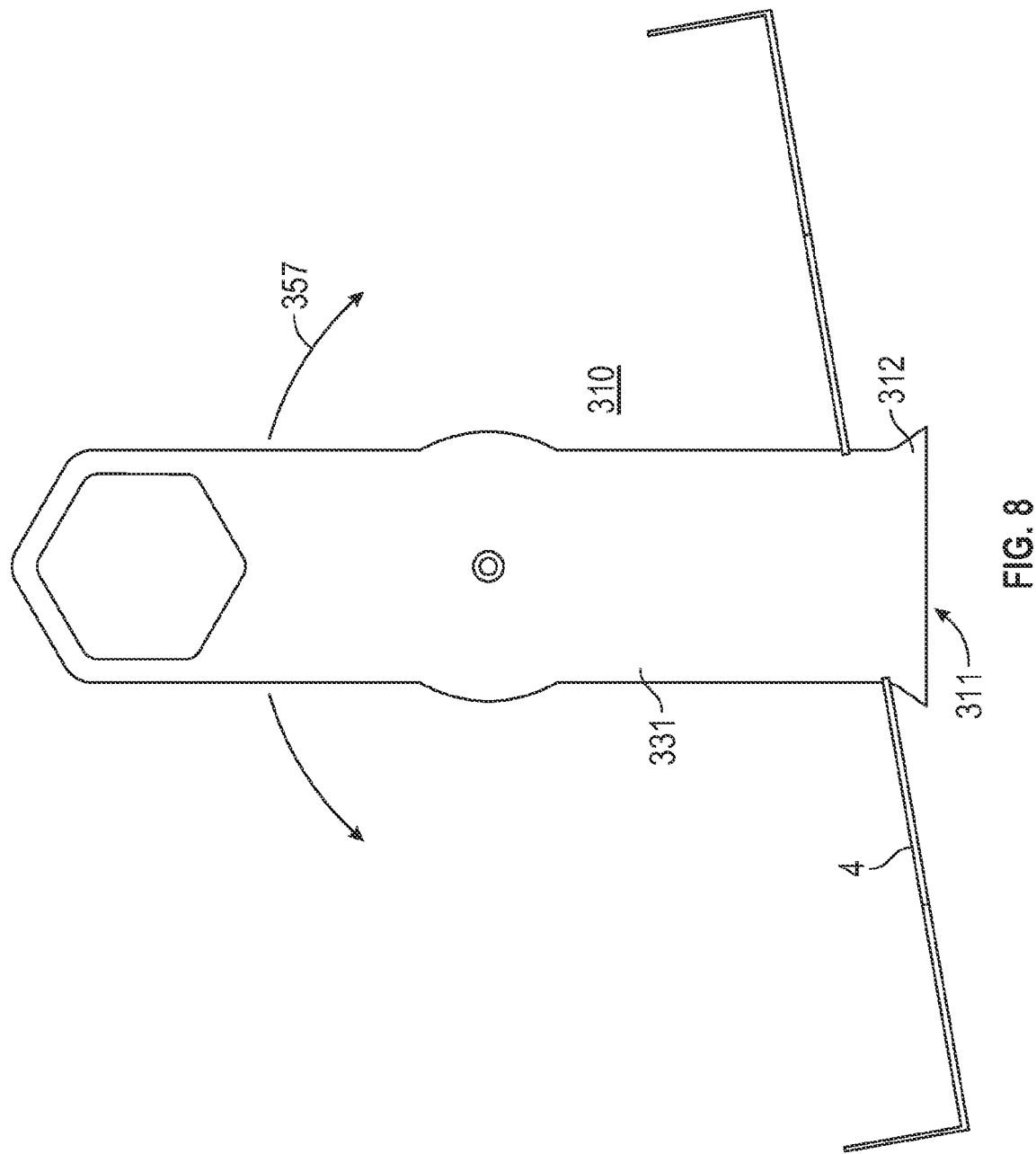
FIG. 8 shows a view from above of a fourth embodiment of the invention fitted on a bottom board of a beehive.

FIG. 8 shows a top view and FIG. 7 shows a perspective view of embodiments of the tunnel which include a flared entrance (212, 312) which provides one form of the circular contour. As indicated by the arrows in FIGS. 7 and 8, the tunnel may pivot about the entrance to move the location of the exit aperture. The flare allows for the particular position of the tunnel exit to be moved around under the beehive frames while retaining a seal with the entrance wall 4.

FIGS. 1-4 show another exemplary embodiment of the invention. In this exemplary embodiment, the outer wall of the tunnel entrance region (11) comprises a circular contour (see more detail below). The tunnel may be pivoted through a wide range of angles until ultimately the tunnel sides interfere with the hive walls. As the tunnel is pivoted, the location of the exit aperture is swept about the base of the beehive such that the exit aperture can be located proximate the hive cluster. As the tunnel is pivoted, the circular form (52) maintains a seal to the outer wall of the beehive.

Positioning of the tunnel exit proximate the location of the cluster provides the hive the best chance of suppressing a wasp invasion due to the typically large number of bees in proximity to the hive entrance which could assemble a defence. The tunnel exit forms a point of entry to the hive, and the point of entry is a location where bees will typically group in large quantities as the bee cluster. An invading wasp will typically wish to avoid engagement of a large cluster of bees and if it proceeds into the hive it will have a forced engagement with host bees by having to go via the cluster. This engagement leads to flight/flight pheromone release by the pest, e.g. wasp to a level that can no longer be reversed. The consequence is that the intruder becomes a marked target that induces an unavoidable natural reaction from the host bees into purposeful engagement with the pest.

In typical use of the invention, a wasp approaches a beehive by a typical path where the tunnel is installed. The wasp will enter the tunnel and, if the bees are active because the outside temperature is sufficiently high, will then encounter an extended length of tunnel that is occupied by many bees. Without the use of the tunnel what typically happens is that the depth of protected area ranges from 1 mm to 40 mm only, as this is the width of the attached steel guard or the thickness of the hive box. It is easy for a wasp to assimilate to the hive when not threatened and the bees do not challenge the wasp. Once the wasp transgresses this barrier they are able to freely move around the interior of the hive in areas that are less populated by defending bees and having not emitted a flight/fight pheromone. In use of the tunnel of the invention, when the wasp enters the hive the protected area is considerably extended, the wasp feels threatened, releasing a flight/fight pheromone thus alerting the bees and allowing the bees to better dominate and defend against intruding wasps. A large cluster of bees is typically encountered at the exit aperture, irrespective of the outside temperature. This cluster functions to repel the wasp and the wasp may retreat from the tunnel or be engaged by defending bees. At this point the naturally induced behavioural reaction of the wasp pheromone can be at a maximum. At this point many and potentially all bees irrespective of their natural role in the hive may convert to guard bees and attack the predator.

Key features of the tunnel of specific embodiments are an elongate tubular form adapted for fitment to the base of a beehive and adapted to provide and maintain a seal with the outer wall of a beehive as the tunnel is pivoted about the gap in the outer wall of the beehive. The tunnel has an interior defined by at least an upper tunnel surface portion and a lower tunnel surface portion which in some embodiments may be implemented by existing surfaces. The upper and lower tunnel surfaces are spaced apart by sidewalls which include contoured features to ensure a seal which prevents circumvention of the tunnel entranceway. The tunnel has an interior with a first opening located at one end and adapted to define a hive entranceway. The tunnel also has a second opening located in an upper tunnel surface portion to thereby define a tunnel exit and entrance to the beehive.

Further key features of the tunnel are a floor surface and a ceiling surface. The floor (which may be formed by the hive floor) and ceiling define a tunnel entrance there between at a first tunnel end. Located at an opposing end of the tunnel is another opening in the ceiling surface.

Suitably the tunnel of the invention is 50 mm or greater in length, preferably 100 mm or greater, more preferably 150 mm or greater, measured from the entrance to the first point at which bees can exit the tunnel. It can be up to 400 mm or up to 300 mm; it is often about 180 mm to 220 mm as this length fits many hive sizes. In specific examples below the tunnel was approximately 200 mm, this length being found to direct incoming bees or pests to directly below the cluster. In some embodiments, the tunnel comprises a length of about: 50 mm to 200 mm; 60 mm to 200 mm; 70 mm to 200 mm, 80 mm to 200 mm, 90 mm to 200 mm, 100 mm to 200 mm, 110 mm to 200 mm, 120 mm to 200 mm; 130 mm to 200 mm; 140 mm to 200 mm; 150 mm to 200 mm; 160 mm to 200 mm, 170 mm to 200 mm, 180 mm to 200 mm, 190 mm to 200 mm, 50 mm; 60 mm, 70 mm, 80 mm, 90 mm, 100 mm; 110 mm; 120 mm; 130 mm; 140 mm; 150 mm; 160 mm; 170 mm; 180 mm; 190 mm; or 200 mm in length. In specific embodiments described in more detail herein, the tunnel is approximately 200 mm long, at which point bees can exit the tunnel vertically upwards.

Tunnel length and/or position is preferably such that invaders cannot avoid arriving at the cluster (during winter, also referred to as the winter cluster). Optionally, in fitting the tunnel, a user adjusts tunnel location with respect to other hive elements to position the tunnel exit closer towards the actual or anticipated cluster position for the hive.

Generally, the cluster will be backed up against the insulation wall made of honey by the bees relative to the coldest side of the hive and least exposure of the sun. The bees will usually not be too far forward to be out in the cold away from the insulation wall. The tunnel length can also be adjustable to adapt to the design of the hive, different cluster positions depending on the geographic location of the hive, available sunlight hours that falls on the hive and the time of day this falls as well as breed characteristics. Telescopic tunnels, with wall slide that side relative to each other, can be used to provide adjustable tunnel length.

Suitably, the tunnel entrance is 30 mm or greater in width, more suitably 40 mm or greater, preferably 50 mm or greater. Again suitably, the entrance is up to 200 mm in width, more suitably up to 150 mm, preferably up to 100 mm. In some embodiments, the tunnel comprises an entrance width of about: 50 mm to 150 mm; 60 mm to 150 mm, 70 mm to 150 mm, 80 mm to 150 mm, 90 mm to 150 mm, 100 mm to 150 mm, 110 mm to 150 mm, 120 mm to 150 mm, 130 mm to 150 mm, 140 mm to 150 mm, 50 mm; 60 mm, 70 mm, 80 mm, 90 mm, 100 mm; 110 mm; 120 mm; 130 mm; 140 mm; or 150 mm opening width. In specific embodiments described in more detail herein, the entrance is approximately 60 mm to 65 mm wide.

The tunnel height is suitably 12 mm or less, preferably 11 mm or less and more preferably 10 mm or less; a height of e.g. 10 mm indicates the tunnel can accommodate a bee of that height, etc. In some embodiments, the tunnel comprises an interior height of about 8 mm to 10 mm. In some embodiments, the interior height is uniform. In some embodiments, the interior height changes and has a minimum height of about 8 mm to 10 mm. Generally the height is at least 6 mm, preferably at least 7 mm.

To install the tunnel typically involves the steps of:

1. inserting the tunnel into a gap in the outer wall of a beehive such that a seal is created between the region of the tunnel proximate the tunnel entrance and the outer wall of the beehive, then 2. pivoting the tunnel exit aperture to thereby locate the exit proximate a hive cluster.

Further, when installed e.g. as a preventative measure as opposed to during a full attack, the tunnel is suitably fixed in place so as to prevent movement away from under the cluster.

In embodiments of the invention, tunnel surfaces are textured or rough to provide a surface suitable for bees to grip while walking. The inside surfaces of the apparatus and the periscope may thus not be completely smooth. In examples below, apparatus were made by injection molding with a sand blasted effect. The texture of apparatus surfaces is as a result non-slippery for the bees. These surfaces enable the bees to walk on the inside surfaces of the tunnel, both on the ceiling of the upper part of the tunnel and floor of the bottom part of the tunnel, without having to flap their wings as much as they would have to if the surfaces were slippery. The same applies for walking on the vertical inside surface of the periscope. The roughened surface makes it easier for the bees to walk over this surface. Provision of the rough surface can make it much easier for the bees to enter and exit the hive through the tunnel and/or periscope. It can also make removing debris from the hive by the bees easier. To achieve this effect, the steel molds of the tunnel parts and the periscope were sandblasted. Once the apparatus is injection molded and come out of the mold, the inside surfaces of the parts have a corresponding slightly rough surface; like very light sand paper to the touch. The outside surfaces of the apparatus do not need to be made this way and are generally smooth.

Referring in more detail to the figures, FIGS. 1a, 1b, 2a, 2b, 3a and 3b depict a first embodiment of the invention (10) having an upper tunnel portion (31) and a lower tunnel portion (32). The tunnel has an entrance (11) and an exit (14). When the apparatus is in position on the bottom board of a beehive, the entrance (11) is positioned external to the beehive and the exit (14) internal to the hive. The exit (14) is in the upper surface of the apparatus to force pests attempting to enter the hive upwards into the cluster. The outer wall of the tunnel entrance (11) comprises a circular contour as a frusto-circular plan form (52) which is outwardly convex and arranged on opposing sidewalls. The tunnel further has drainage holes (54). The upper tunnel portion (31) and lower tunnel portion (32) are secured together by engaging a boss (33) in the upper tunnel portion (31) and a complementary aperture (34) in the lower tunnel portion (32). Once the boss (33) and aperture (34) are engaged, a nail or screw may be passed through the channel (40) formed by the engaged boss (33) and aperture (34) to fix the apparatus to the base of a beehive. This embodiment also has two further structure points comprising a structure boss (43a, b) in the upper tunnel portion (31) and a structure aperture (44a, b) in the lower tunnel portion (32). When the upper tunnel portion (31) and lower tunnel portion (32) are fitted together, the structure bosses (43) and structure apertures (44) are engaged to prevent the collapse of the tunnel. For this embodiment the tunnel is about 200 mm long from the front entrance to the first point at which bees can exit the tunnel, with an overall length of about 270 mm.

FIG. 4 further depicts the first embodiment of the invention fitted on the bottom board of a beehive and passing through the hive wall (4). The frusto-circular section (52) of the apparatus allows the apparatus to be pivoted around a point X (55, centred in this case approximately on structure point 43a) according to the arrows (57) shown in FIG. 4 prior to being fixed in place.

Figure 6A:
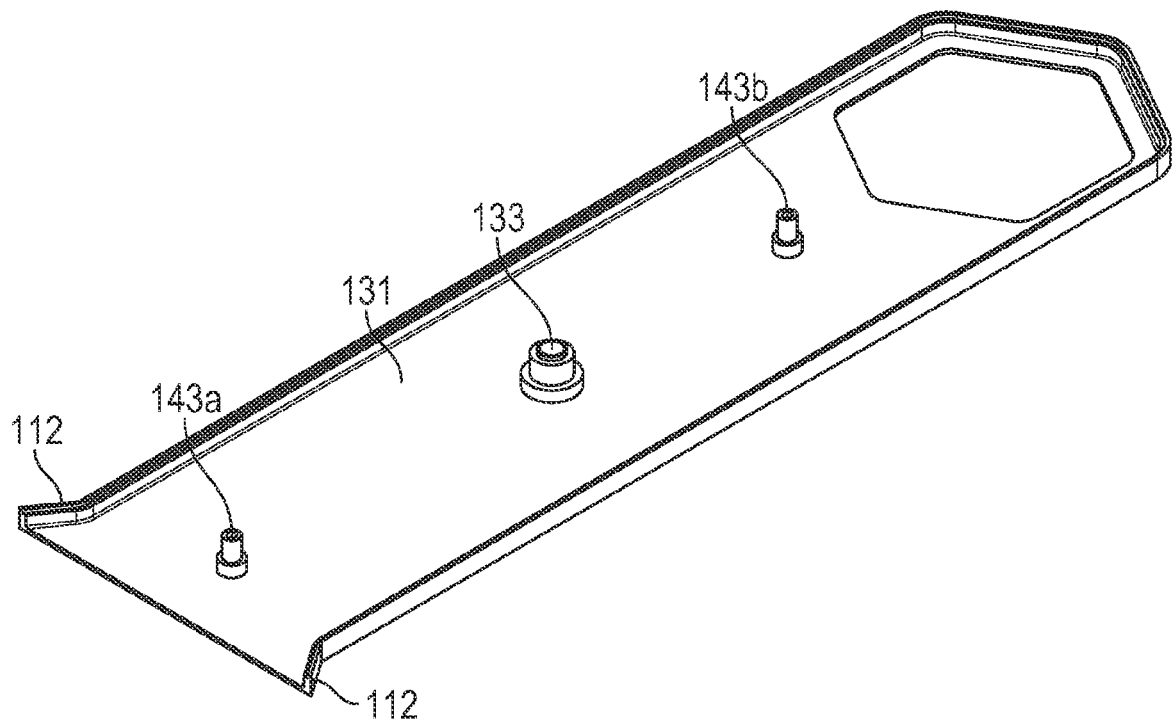
FIG. 6*a* shows a view from above and to the side of the underside of the upper tunnel portion of the second embodiment of the invention.
Figure 6B:
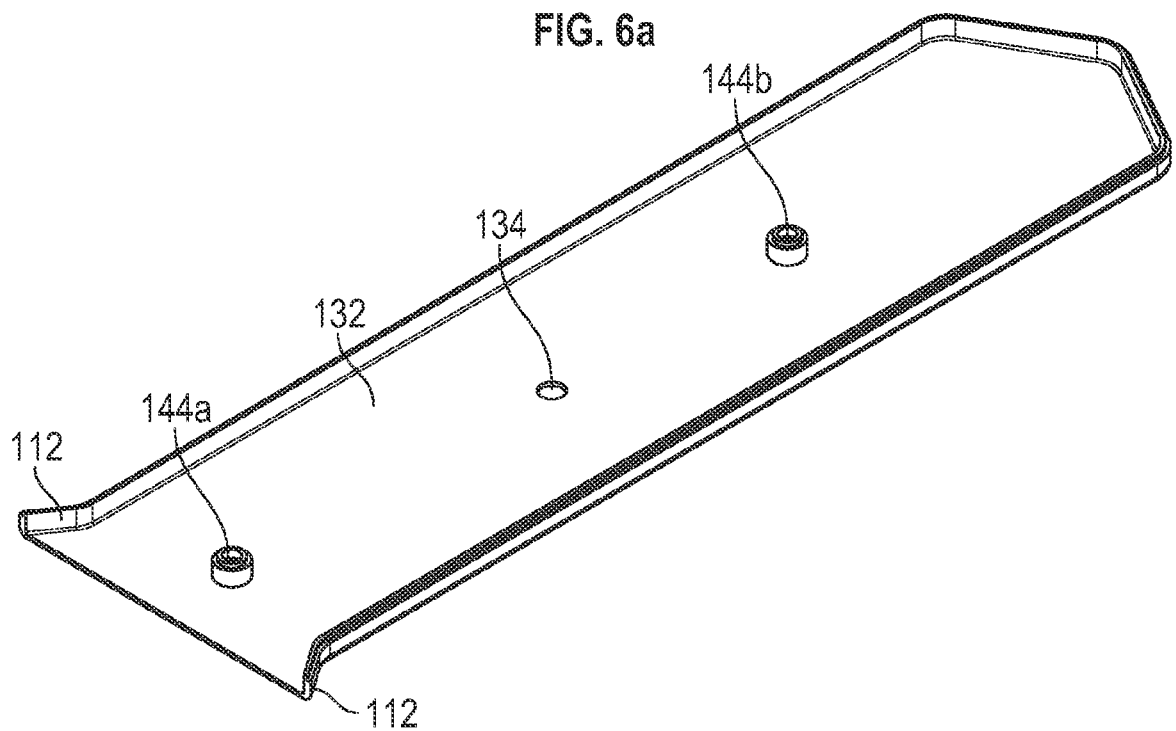
FIG. 6*b* shows a view from above and to the side of the upperside of the lower tunnel portion of the second embodiment of the invention.

FIGS. 5, 6a and 6b show a second embodiment of the invention (110) having a tunnel and comprising an upper tunnel portion (131) and a lower tunnel portion (132). The tunnel has an entrance (111) and an exit (114). The upper tunnel portion (131) and lower tunnel portion (132) have a flare (112) at the entrance (111), this allows the apparatus to be pivoted whilst maintaining a seal between the apparatus and the entrance to the beehive. The upper tunnel portion (131) and lower tunnel portion (132) are secured together by engaging a boss (133) in the upper tunnel portion (131) and a complementary aperture (134) in the lower tunnel portion (132). Once the boss (133) and aperture (134) are engaged, a nail or screw may be passed through the channel (140) formed by the engaged boss (133) and aperture (134) to fix the apparatus to the base of a beehive. This embodiment also depicts additional structure points comprising a structure boss (143a, b) in the upper tunnel portion (131) and a structure aperture (144a, b) in the lower tunnel portion (132). When the upper tunnel portion (131) and lower tunnel portion (132) are fitted together, the structure bosses (143) and structure apertures (144) are engaged to prevent the collapse of the tunnel.

FIG. 7 depicts a third embodiment of the invention (210) having a tunnel, upper tunnel portion (231) and lower tunnel portion (232). The centre of the tunnel comprises a circular contour as a frusto-circular plan form (256) about the channel (240). The channel (240) blocks the centre of the tunnel, therefore the frusto-circular section (256) allows additional space for bees to pass around the channel (240) within the tunnel. FIG. 7 further shows how the apparatus can be rotated according to the arrows (257), whilst maintaining a seal between the flare (212) at the entrance (211) to the tunnel and the entrance to the beehive.

FIG. 8 depicts a fourth embodiment of the invention (310) having a tunnel and an upper tunnel portion (331), in this embodiment there is no lower tunnel protection as the lower surface of the tunnel is formed by the flat base/bottom board of the beehive. FIG. 8 shows how the apparatus can be rotated according to the arrows (357), whilst maintaining a seal between the flare (312) at the entrance (311) to the tunnel through the wall (4) of a beehive.

Figure 9A:
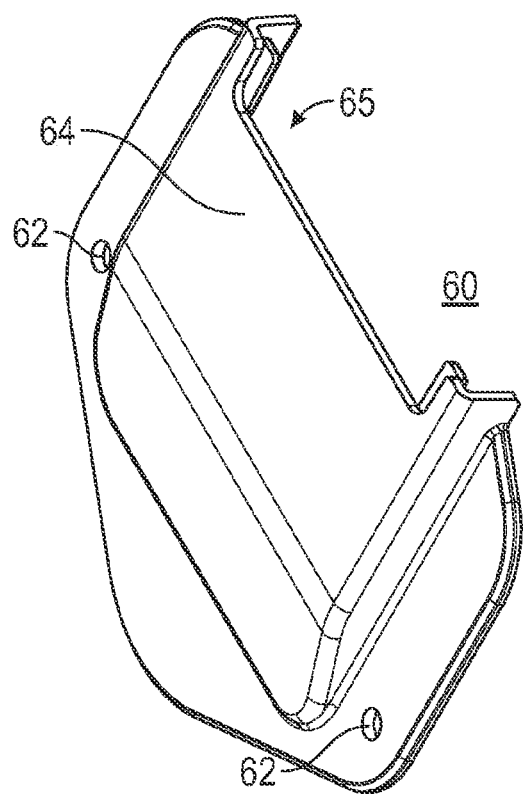
FIGS. 9*a* and 9*b* show views from above and to the side of the upper and undersides respectively of a periscope attachment for use with an apparatus of the invention.
Figure 9B:
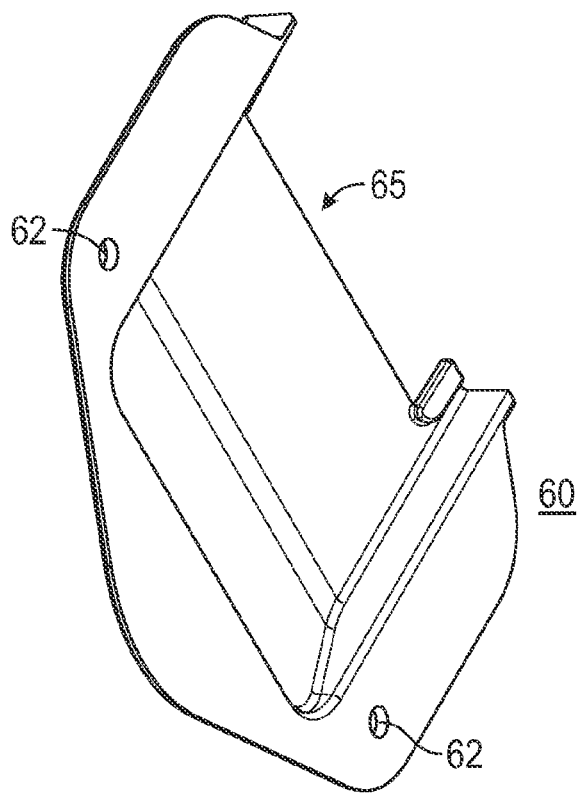
Figure 10:
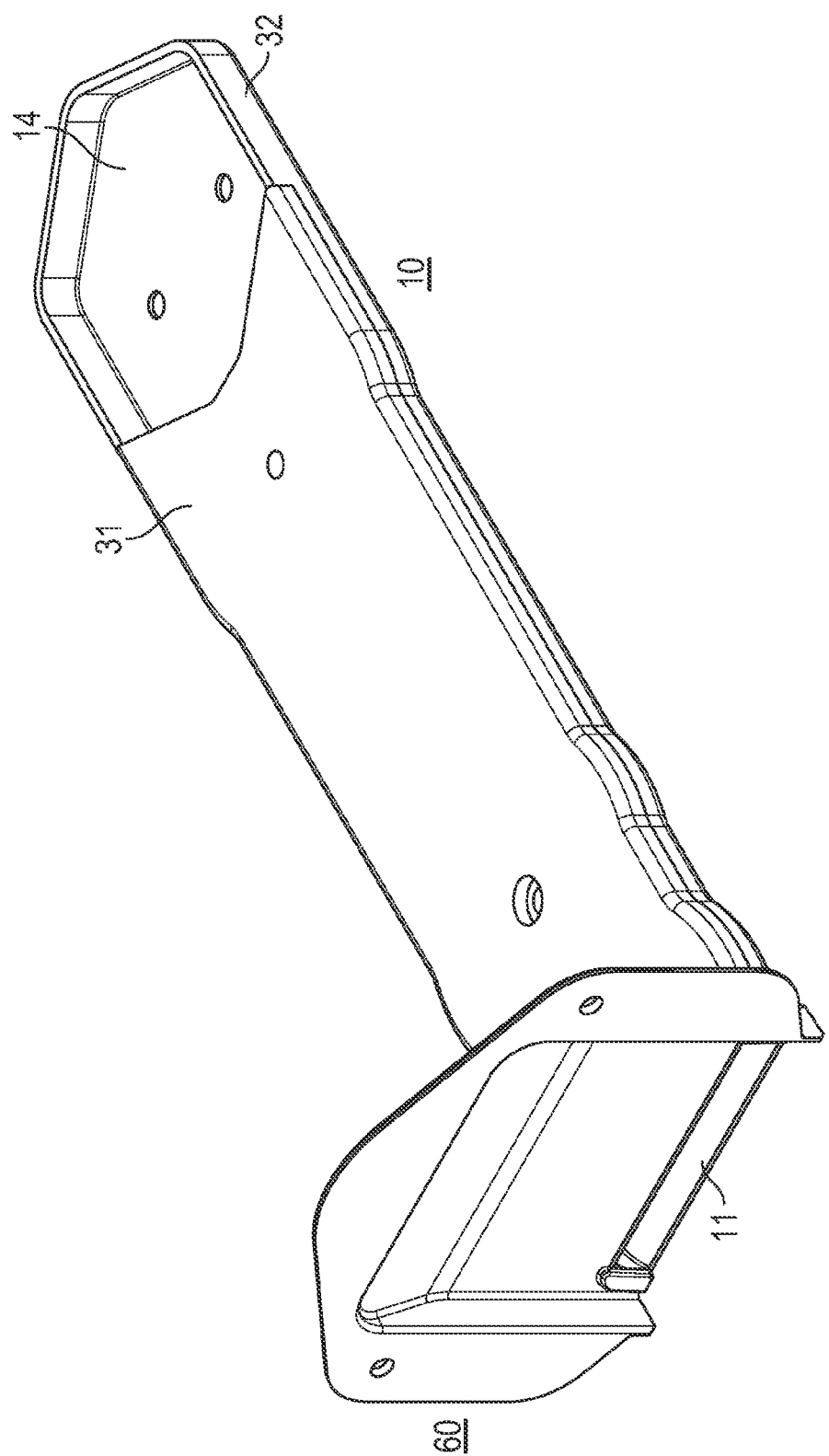
FIG. 10 shows a view from above and to the side of a first embodiment of the invention connected to a periscope attachment

FIGS. 9a, 9b and 10 show an optional periscope addition to be used with the apparatus of the invention—shown connected to the first embodiment in FIG. 10. Screws or nails can be passed through the holes (62) to secure the periscope (60) over an irregular shaped beehive entrance (not shown). The periscope (60) attaches to an inner face of the hive and has an entrance covering portion (64) and an opening (65). The apparatus of the invention (10) may be connected to the opening (65) to form a seal between the opening (65) and the entrance (11, 111, 211, 311) of the apparatus of the invention; this allows the apparatus to be used on non-standard beehive entrances, for example circular entrances which may be positioned higher than the base of the hive. As described above access to the hive is then via the entrance (11, 111, 211, 311) of the apparatus of the invention.

Benefits

Conventionally, the bees will naturally defend only a hive entrance when the outside temperature is sufficiently warm. The entrance may be 10 mm to 370 mm wide by about 10 mm high. The depth varies from 1 mm to 40 mm and essentially just the depth of the thickness of the box or applied entrance reducer. So, once the wasp passes this entrance and the few guard bees that are there, they are into the hive and are strong enough to dominate and do whatever they please. The tunnel according to the above described embodiments forces a wasp to enter the hive and then have to walk the length of the tunnel, this being e.g. about 200 mm in length. Along the way the wasp will typically face a barrage of defending bees and is often completely outnumbered.

Further, with the exit aperture being located in the ceiling of tunnel, and at a position which may not be at the end of the tunnel, the wasp once inside the hive may not then identify the location in which to exit the hive. Any wasp that is already inside the hive and is wanting to exit does not have a clear access to the internal exit aperture, which for a wasp trying to exit is now in reverse the entry point of the tunnel, because of the larger cluster of bees at this position. The wasps perpetually try to exit the hive by searching for gaps around the internal perimeter of the hive; however, there are no exit points for them on the hive perimeter so at some point in time they die either due to sustained bee attack or from running out of resources and effectively starve or dehydrate. Also noteworthy is that for any wasp that has gained entry into the hive, they would have done so under considerable attack from the cluster bees. They will have learnt that their position of entry into the hive is extremely hazardous but also not learnt that this is the start of the exit point from within the hive.

Bees have an amazing communication mechanism and they very quickly learn how to use the tunnel as the entranceway to their hive. However, a wasp has no instinctive ability to navigate the tunnel because they do not get the opportunity to learn by trial and error. They are not immediately familiar with how to navigate the tunnel. For this reason, when the tunnel is deployed wasps will often become disorientated within the hive and not find their way out of the hive.

Typically for a wasp that does enter and exit a hive, they will communicate this to their colony which will result in more wasps attacking the hive. Where a wasp does manage to navigate a hive with the tunnel present, it is very difficult for them to navigate their way out of the hive again, back through the tunnel. Therefore the wasp often dies inside the hive by losing energy tracing the hive perimeter, never finding their way back into the tunnel. The wasp that enters the hive but dies is never provided the opportunity to communicate the navigation path to their colony.

Apparatus of the invention was tested as follows.

Example—Field Testing

Day 1: Wasp lures were positioned on and around the test site two weeks prior to testing for the purpose of luring wasps to the test site and substantially increasing the number of wasps at the test site, and making sure a sufficiently high number of wasps would be present to enter the test hives once testing was started. Wasps were chosen as the predator in this experiment since it is easier to film a wasp attack than it is to film robbing of bees by bees. They are also prevalent in New Zealand.

A console was set up with the same dimensions as the commonly used, commercial 10-frame LANGSROTH® beehive box—610 mm high×410 mm wide×510 mm long. The top surface of the console was made of glass and a camera was placed inside the console on the ground, facing upwards. The inside of the console was blacked out to keep any disrupting light out.

Day 8: 4 hives were brought to the test site. Each beehive was placed on top of a console, the beehive itself had no floor and the glass top surface of the console acted as the beehive floor. This allowed the camera in the console to film the activity inside the beehive. At this time, the wasp lures were removed.

Hives were set up next to each other all facing same direction with equal spacing apart. Hives were then manually weakened by removing frames with bees and stores. Frames were replaced with empty frames. All four hives were left with 1.5-2 full frames of bees and stores. All queens were of a similar age and quality in an effort to eliminate any manageable variances within the test colonies to provide a comparable base line.

Weakening the beehives creates a situation where a colony of bees will have some difficulty defending itself and the wasps have a good chance of entering the hive successfully. The wasps were given a further advantage since this experiment was carried out in winter when bees are less active than wasps meaning there were fewer defending bees by the entrance to the beehive. During the months when the experiment was carried out the temperature was around 10 degrees Celsius in the mornings; at this temperature bees are not active and are stuck in their cluster. Bees will only become active when the temperature increases to approximately 12 to 14 degrees Celsius or higher. Wasps, however, are active and flying down to around 9 degrees Celsius.

The hives were left alone for three days with a 65 mm×10 mm galvanised mouse guard on the entrance protecting them. Filming commenced and there were general visual observations made.

Day 12: Manual observation of the entrance of the hive was made and only clearly identified sitings were recorded in the count. With this count, 1 represents an entry and exit. Any wasp that went out of sight inside the entrance was classified as a successful entry.

The results were noted over 4 hours with a total of 268 wasps and an average count of 67 wasps that successfully entered and left each hive per hour (average, n=4).

Before the apparatus of the invention was added, multiple wasps were observed to be entering, robbing and exiting the hives successfully. There was little resistance from the bees, especially in the morning, since the bees were stuck in their cluster. Once inside the beehive the wasps were observed to slink around the outer edges of the inside of the beehive, largely being undetected by the bees. The wasps were able to get a feeling for the hive and, since they were relaxed, take what they wanted before easily finding the exit to the hive and leaving, without being noticed by bees. Wasps that raid the hive eat the honey or the pollen to then return to their own colony to regurgitate it into the cells that their eggs are laid into.

On the same day post this observation, the apparatus of the invention was installed in two hives by inserting it through the front entrance from the outside leaving no gaps or other entrances for bees or wasps to enter the beehive other than via the tunnel. Only the top half of the apparatus was used in this testing so as to be able to see and record movements in the tunnel during the testing. The exit to the tunnel was installed facing upwards close to the cluster within the beehive, though not fixed in place. This was to assess if the apparatus could be used as a way of stopping an attack in progress. If no action was taken, a hive would be devastated and destroyed or a beekeeper would need to relocate the hive to at least 3 km away from its current location so that the wasps could not continue the attack.

The apparatus was inserted into the single entrance to the hive meaning, once it was in place, all bees and wasps had to enter and exit the hive through the apparatus.

The other two hives did not have an apparatus installed and were used as control hives. All hives were visually observed over the next hour.

After the apparatus was inserted, a change in the wasp and bee behaviour was observed. The two hives with the apparatus installed saw a drop of 95% of (assumed to be) returning wasps. Over a one-hour period directly after fitting the apparatus the observer counted the number of wasps that entered a hive and did not exit, making a total of 4. The 95% is the balance made up of all wasps that the observer saw flying around and attempting to enter but either did not enter or entered and exited. This 95% was seen settling on the hive around the entrance and then flying off without entering. They would fly around the hive looking for an alternative entrance before returning to the only entrance available. Some of them entered the apparatus but exited very soon thereafter. The observer was able to validate this from the recording after visual observation for one hour. From the camera below the apparatus, it was noticed that the wasps were seen to stay close to the side walls of the tunnel, with many wasps exiting immediately without even entering the beehive. Those that did not enter or remain in the hive became agitated. When a wasp is docile and trying to blend in with the bees, its actions are smooth and its body position is low and elongated. When agitated, the actions become erratic and the body becomes more rounded with an arched back. The agitated wasps were observed to then vacate the hive and move to the unprotected adjacent hive, leave the area altogether or grab a bee as an alternative source of protein and bite it in half, taking half back to their colony as a consolation prize. This would be their second choice protein source for this time of the year.

The 5% that went into the hive were observed over the following 3 to 4 hours as follows. They were harassed by the bees, forcing them to remain around the base of the hive, sticking to the outside wall of the hive and never going up to the honey. They were in heightened state of alertness and stress where the bees would continuously and persistently attack the predator until either it died of exhaustion or was stung to death.

The two hives that did not have the apparatus installed saw a marked increase in the number of attacks from the diverted wasps. This was clearly observed happening.

After 48 hours the hives that did not have the apparatus installed had such a strong and ongoing wasp attack that it was evident that the hives would not survive and no further observations were necessary. These hives were then moved back to their original apiary over 3 km away.

Over the following 12 days, the attacks on the hives with the apparatus installed, reduced to an average of 6 within a 24-hour period. This progressively became sporadic and negligible to track.

The monitoring equipment was kept in place for an extended period after the test, to confirm that with the apparatus installed there were no tunnel blockages and all hive debris was removed as in unmodified hives.

Example—Humidity and Ventilation Testing

Two observation hives were positioned next to each other:
one with an apparatus of the invention,
one without an apparatus of the invention, but with a similar size entry width and height at the front of the hive comparable with the apparatus tunnel entrance.

In both hives we replaced the bottom base with a glass floor. Both hives were observed from below with cameras. The apparatus used was a version that is a single piece, without a floor (not needed as the glass surface is flat and the top tunnel portion sits flat on and tight to the flat surface which forms the tunnel floor) so we could observe from below what was happening inside the tunnel as well.

On the days that the bees were extracting large amounts of humidity from the hives we observed the following:

In the hive with the apparatus of the invention, the part of the glass floor directly under the tunnel was completely condensed. The only way you knew bees were in the tunnel was by the footprints they made up and down the tunnel. Before the condensation happened we noticed a group of bees positioning themselves throughout the length of the tunnel in a zigzag type pattern, fanning their wings.

The other hive only had a small triangle of condensation on the glass by the entrance/exit of the hive. We observed bees at the entrance and some inside the hive near the entrance fanning their wings.

Multiple bees instinctively positioned themselves up and down the tunnel and fanned their wings, creating an airflow pulling humid air from within the hive and pushing it through the tunnel to the exit. The opening of the apparatus sits under the warmest part of the hive (the cluster) and the bees can work this like an extractor fan if they need to remove hot or humid air (like a rangehood above the stove in a kitchen).

Without this tunnel the ventilation and removal of moisture can still happen, but less effectively.

Without the tunnel there is a wide-open hive floor with an opening in the front wall of the hive. To extract humid air effectively in that situation would probably require more bees and may also mean that more humid air is circulated around the hive than aimed and extracted by the exit. These observations suggest that with the apparatus installed, it was easier to create an effective pull & push effect of air from inside the hive to the exit through the tunnel than through a wide-open base floor to a front exit.

Both hives had a wooden landing board outside the front of their entrances. The hive with the tunnel of the invention showed extracted humidity forming beads of water on the landing board in front of the hive entry/exit.

The hive without the tunnel showed a damp spot on the landing board in front of the hive entry/exit, but not nearly as much humidity as the hive with the apparatus.

This showed that the bees more effectively extracted humidity from the hive when the apparatus having the tunnel was installed.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention.

The invention claimed is:

1. A beehive entrance apparatus for fitment to a base of a beehive, the beehive entrance apparatus being an elongated structure having a first end and an opposite second end, the beehive entrance apparatus comprising:
   an upper tunnel portion including a ceiling surface, and a lower tunnel portion including a floor surface, the lower tunnel portion opposite the upper tunnel portion, p1 a first sidewall and a second sidewall, the second side wall opposite the first sidewall, wherein the first and second sidewalls space apart the upper tunnel portion and the lower tunnel portion,
   an entrance aperture at the first end of the beehive entrance apparatus configured to allow bees to enter the beehive entrance apparatus, the entrance aperture comprising an opening, the opening having a width defined by the ceiling and floor surfaces and a height defined by the first and second sidewalls, wherein the width of the opening of the entrance aperture is 40 mm or greater and the height of the opening of the entrance aperture provides for no more vertical space than is required by one bee,
   a single upwardly-opening exit aperture at the second end of the beehive entrance apparatus and located in the upper tunnel portion, wherein the exit aperture is configured to be positioned within the beehive and to allow the bees to exit the beehive entrance apparatus into the beehive and has an opening which is equal in area to or larger than the opening of the entrance aperture, and
   an enclosed tunnel communicating between the entrance aperture and the exit aperture, the tunnel comprising an interior, the interior having an interior width defined by the ceiling and floor surfaces, an interior height defined by the first and second sidewalls, and an interior length defined by the upper and lower tunnel portions, wherein the interior width of the tunnel is 40 mm or greater, the interior height of the tunnel provides for no more vertical space than is required by one bee, and the interior length of the tunnel is 100 mm or greater, the interior length measured from the entrance aperture to a first point at which the bees can exit the tunnel from the exit aperture located in the upper tunnel portion at the second end opposite the entrance aperture at the first end, the exit aperture being spaced from the floor surface of the lower tunnel portion by the first and second sidewalls.

2. The beehive entrance apparatus according to claim 1, wherein the first and second sidewall each comprise an outwardly orientated circular contour located proximate the entrance aperture, the circular contours operable to form a seal with an outer wall of the beehive and facilitate pivoting of the second end relative to the outer wall so as to selectively locate the exit aperture within the beehive while maintaining that seal between the circular contours of the first and second sidewalls and the outer wall of the beehive.

3. The beehive entrance apparatus according to claim 1, wherein the tunnel provides a path which extends between an exterior of the beehive to a location near an active cluster within the beehive.

4. The beehive entrance apparatus according to claim 1, wherein the beehive entrance apparatus comprises a sealing surface shaped for engagement with an outer wall of the beehive, and shaped to allow movement of the beehive entrance apparatus to desirably position the exit aperture while retaining the seal with the outer wall of the beehive.

5. The beehive entrance apparatus according to claim 1, wherein the interior height of the tunnel is about 8 mm to 10 mm.

6. The beehive entrance apparatus according to claim 1, wherein the opening of the entrance aperture is about 50 mm to 150 mm.

7. The beehive entrance apparatus according to claim 1, wherein the interior length of the tunnel is about 120 mm to 200 mm.

8. A method of installing a beehive entrance apparatus in a beehive, wherein the method comprises the steps of:
   providing the beehive entrance apparatus as claimed in claim 1;
   inserting the beehive entrance apparatus into a gap in an outer wall of the beehive such that a seal is created between the region of the beehive entrance apparatus proximate the entrance aperture and the outer wall of the beehive; and
   pivoting the beehive entrance apparatus to thereby locate the exit aperture proximate a hive cluster.

9. The method according to claim 8, wherein the interior height of the tunnel is up to 10 mm, the interior width is at least 50 mm, and the interior length is at least 150 mm.

10. The method according to claim 8, wherein the tunnel comprises at least two sections, a first section in which the bees must move substantially horizontally to advance towards a hive interior and a second section in which the bees must move substantially vertically to exit the tunnel and gain access to the hive interior.

11. The method according to claim 8, wherein for a pest at a position inside the beehive and not yet in the tunnel, there is no line-of-sight from the position inside the beehive to the outside of the beehive.

12. The method according to claim 8, wherein when the bees are present, the exit aperture is at or adjacent the hive cluster.

13. The method according to claim 8, wherein the interior length of the tunnel is 150 mm or greater.

14. The method according to claim 8, wherein the interior length of the tunnel is 120 mm to 200 mm.

15. A beehive comprising a beehive entrance apparatus, the beehive entrance apparatus being an elongated structure having a first end and an opposite second end, the beehive entrance apparatus comprising:
- an upper tunnel portion including a ceiling surface, and a lower tunnel portion including a floor surface, the lower tunnel portion opposite the upper tunnel portion,
- a first sidewall and a second sidewall, the second side wall opposite the first sidewall, wherein the first and second sidewalls space apart the upper tunnel portion and the lower tunnel portion,
- an entrance aperture at the first end of the beehive entrance apparatus configured to allow bees to enter the beehive entrance apparatus, the entrance aperture comprising an opening, the opening having a width defined by the ceiling and floor surfaces and a height defined by the first and second sidewalls, wherein the width of the opening of the entrance aperture is 40 mm or greater and the height of the opening of the entrance aperture provides for no more vertical space than is required by one bee,
- a single upwardly-opening exit aperture at the second end of the beehive entrance apparatus and located in the upper tunnel portion, wherein the exit aperture is configured to be positioned within the beehive and to allow the bees to exit the beehive entrance apparatus into the beehive and has an opening which is equal in area to or larger than the opening of the entrance aperture, and
- an enclosed tunnel communicating between the entrance aperture and the exit aperture, the tunnel comprising an interior, the interior having an interior width defined by the ceiling and floor surfaces, an interior height defined by the first and second sidewalls, and an interior length defined by the upper and lower tunnel portions, wherein the interior width of the tunnel is 40 mm or greater, the interior height of the tunnel provides for no more vertical space than is required by one bee, and the interior length of the tunnel is 100 mm or greater, the interior length measured from the entrance aperture to a first point at which the bees can exit the tunnel from the exit aperture located in the upper tunnel portion at the second end opposite the entrance aperture at the first end, the exit aperture being spaced from the floor surface of the lower tunnel portion by the first and second sidewalls.

16. A beehive according to claim 15, wherein the interior length of the tunnel is 150 mm or greater in length, measured from the entrance aperture to the first point at which the bees can exit the tunnel.

17. The beehive entrance apparatus according to claim 1, further comprising a contoured section that enables the beehive entrance apparatus to be pivoted whilst maintaining a seal between the beehive entrance apparatus and an entrance to the beehive.

18. The beehive entrance apparatus according to claim 1, wherein the tunnel comprises at least two sections, a first section in which the bees must move substantially horizontally to advance towards a hive interior and a second section in which the bees must move substantially vertically to exit the tunnel and gain access to the hive interior.

19. The beehive entrance apparatus according to claim 2, wherein the circular contour is selected from the group consisting of convex plan form, frusto-circular plan form, and flare plan form.

* * * * *